Jan. 4, 1938.   A. E. OSBORN   2,104,351
PIPE JOINT
Filed Dec. 24, 1936
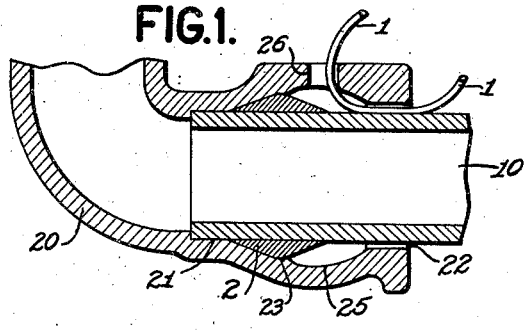
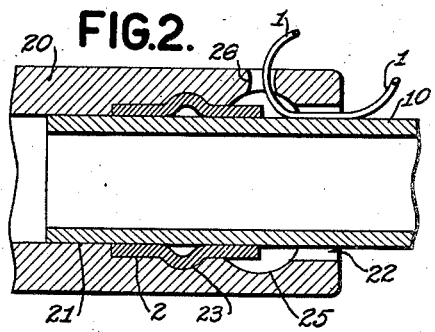
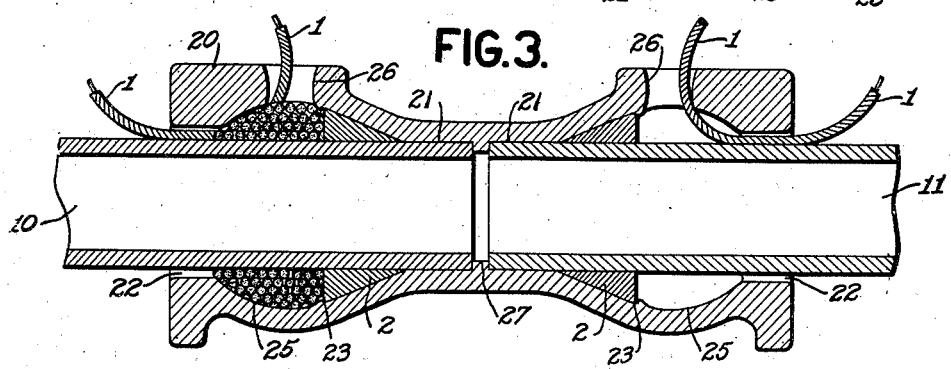
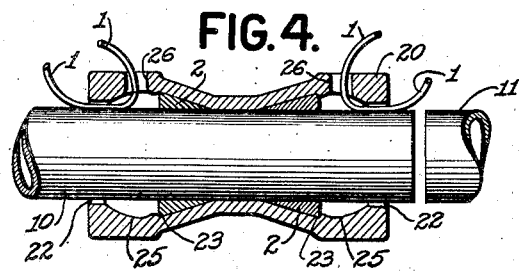
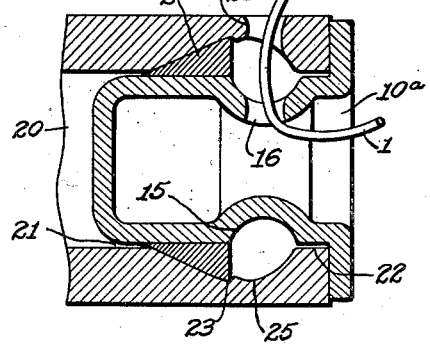
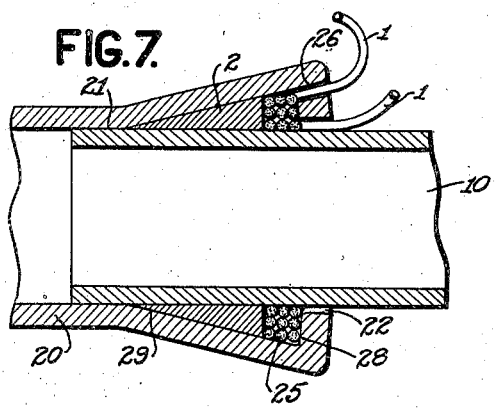
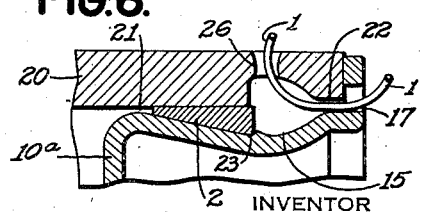
INVENTOR
Alden E. Osborn Patented Jan. 4, 1938

2,104,351

UNITED STATES PATENT OFFICE 2,104,351

PIPE JOINT

Alden E. Osborn, New York, N. Y.

Application December 24, 1936, Serial No. 117,430

6 Claims. (Cl. 285—193)

My invention relates to a pipe joint, or means for attaching fittings or couplings to pipe or other objects, which will not only firmly retain the parts to be connected in position, but also forms a leak-proof joint capable of withstanding considerable pressure. This joining means is very inexpensive, as threads, bolts, etc. are eliminated, and can be adapted to a large variety of conditions and uses without departure from the spirit and scope of the invention as defined in the appended claims.

In the accompanying drawing:

Figure 1 represents a longitudinal sectional view of my invention applied between a pipe and fitting.

Figure 2 represents a longitudinal sectional view of a slight modification of the joining means of Figure 1.

Figure 3 represents a longitudinal sectional view of a further modification applied to a coupling for connecting two pipes.

Figure 4 represents a longitudinal sectional view of the joining means of Figure 3 in a modified coupling permitting a different method of assembling the device.

Figure 5 represents a longitudinal sectional view of my invention applied to a joint between a fitting or other article and a cover therefor.

Figure 6 represents a longitudinal part sectional view of a modification of Figure 5, and Figure 7 represents a still further modification of my invention shown applied to a fitting similar to that of Figures 1 or 2.

In Figure 1 my invention is arranged to fasten, with a leak-proof joint, the pipe or tube 10 into the fitting 20. This fitting 20 is provided with a socket which at 21 fits the pipe 10 with relatively little clearance, while at 22 it has considerable clearance. Between these two different diameter parts, the fitting is provided with a circumferential channel 25 and with an aperture 26 which perforates the wall of the fitting and opens into the channel. At the side of this channel 25 adjacent to the clearance 21 a ring 2 is arranged which is shown as held from movement longitudinally by reason of its largest diameter part engaging a small groove 23 in the channel wall at the side of the largest diameter part of the channel thru which the aperture 26 opens. The ring 2 is made of a soft, elastic or plastic metal or any other material suitable for packing purposes and, in the form of my invention shown on this figure, it is intended that it would be inserted into the channel 25 by deforming it and thereafter expanding it to fit its special groove 23 in the channel. There is also provided, in order to complete my invention, a wire or cord 1 of metal or any other relatively hard and strong material.

The method of assembling this joint is as follows:—The end of the wire 1 is passed thru the aperture 26 of the fitting 20 and out of the enlarged opening 22 of the socket therein and the pipe 10 is thereafter put in position within the socket with the wire 1 extending thru the clearance between the pipe and the enlarged part 22 of the socket opening. The pipe 10 (or fitting 20 if it is more convenient) is then turned with the end of the wire 1 that extends beyond the clearance held from movement relative to the pipe with the result that the part of the wire 1 that extends outside of the aperture 26 will be pulled thru the aperture and wound about the pipe 10 until the channel 25 is filled to the extent desired to retain the pipe in position. While the wire is being drawn into the channel and wound about the pipe, it also winds against and around the packing 2 with the result that the packing is not only compressed, with a sufficiently high pressure to eliminate leakage, directly against the outside of the pipe 10, but is also pressed against the pipe by its longitudinal movement because of the wire pressure forcing it between the tapered surface in the channel adjacent to the clearance 21 and the outer surface of the pipe. By having the packing means for the joint inserted therein before the pipe is put in position within the socket, considerable advantages are obtained, for many uses, over the construction shown in my co-pending application for a Pipe joint, Serial No. 104,011 filed October 5, 1936, issued as Patent No. 2,101,155 of December 7, 1937, (in which two wires or cords of different characteristics are wound into the socket) or my co-pending application for a Pipe joint, Serial No. 110,196, filed November 11, 1936, issued as Patent No. 2,102,434 of December 14, 1937 (in which a single special cord having two different characteristics is wound into the socket) in that my present invention permits an even tighter and more secure joint to be obtained and is easier to operate as only a single strong retaining wire has to be wound into the socket channel.

Owing to the fact that the wire 1 is of relatively strong material it is easily possible to obtain a very high pressure on the exterior of the pipe 10 before the strain of pulling the wire thru the aperture is sufficient to break the same and, in some cases, an actual groove would be formed in the pipe before the wire breaks, thus holding the pipe very securely. It will be noticed that the object of the clearance at 22 in the pipe socket of the fitting 20 is to enable the end of the wire I to pass outside the fitting adjacent to the pipe 10 so that the end can be held from movement in relation to the pipe during the first turns of the pipe or fitting in the process of winding the wire into the socket, and that this feature is in accordance with and serves the same purpose as the construction described and claimed in my patent for a Protector, No. 1,949,431 of March 6, 1934 and will not be further dealt with herein.

In the modification shown in Figure 2, the packing material 2 is of a somewhat different form from that illustrated in Figure 1 in that it is in the form of a sleeve of such outside diameter that it can be inserted into the socket in the fitting 20 thru the clearance 22 and is thereafter expanded into the groove 23 so that it is, as shown, prevented from free longitudinal movement, although it can be left to float freely without longitudinal restraint if desired, in which case the special groove 23 and the expansion of the sleeve would be unnecessary. The application of this form of my invention to the pipe is accomplished in the same way as the previously described forms are applied, as the retaining wire I is wound against and about the packing 2 and pipe 10 in exactly the same manner.

In Figure 3 is shown a further modification of the joints illustrated in Figures 1 and 2 and just described, which modification is shown as applied to a coupling for joining pipe. In this figure my pipe joints are at each end of the coupling 20 and one of them is shown as having the wire I wound in position while the other is shown with the wire I passed thru the aperture 26 and the clearance at 22, but not yet wound about the pipe. The joint last to be tightened would preferably be made up by turning the pipe entering this joint after the coupling had been applied to the other pipe by rotating the coupling. However, in some cases, both joints between the coupling and pipes can be tightened simultaneously by rotating the coupling with both pipes stationary provided the proportions of the parts and wires are such that approximately equal pressure can be obtained on both joints when the tightening is completed.

A modification of this coupling design is illustrated in Figure 4 in which figure the coupling is shown in the course of its application to the ends of the two pipes 10 and 11. In the coupling of this figure the centralizing flange 27 of Figure 3 is eliminated, thus permitting the coupling to be pushed entirely over the end of one of the pipes when the pipe line is being assembled and then, before the wires are tightened, moved to encompass the ends of both pipes. This arrangement has advantages in some cases.

In Figures 3 and 4 as well as in the figures hereinafter described, the packing 2 is shown as arranged to be forced against the adjacent parts in a manner to prevent leakage by the longitudinal pressure of the wound in retaining wire I against it and by the wedge action due to the tapered surface of the inner wall of the channel 25. A small groove 23 is provided to prevent the packing from being displaced before the wire I is in position. It will be noticed that, with the parts proportioned as shown in these views, the outside diameter of the packing is considerably larger than the socket opening of the fitting and it is preferred that this packing be made of lead or some other relatively soft and plastic material that can be cast in position about a mandrel or core temporarily placed in the socket.

In Figure 5 is shown another application of my invention, in that the fitting 20 may be the rim of an inspection opening of a tank or boiler or the end of a bottle barrel, drum or container around the opening thereof, while instead of the pipe 10 a plug or cover 10a is arranged to be held in this opening of the fitting or equivalent part. Owing to the fact that this plug 10a can, unlike the pipe 10 of the preceding figures, be especially formed, advantage is taken of this possibility and it is shown as provided with a channel 15 and also with an aperture 16 intersecting the channel whereby the end of the wire I can be passed thru this aperture 16 and reached and held immovable in relation to the plug 10a while the wire is being wound into position. It will be noticed that the clearance at 22 of the preceding figures is rendered unnecessary and that the socket for the plug can, except for the channel, be of uniform diameter. This arrangement of my invention is, in certain of its features not hereinafter claimed, related to and claimed in my co-pending application for a Means for attaching members to the interior of hollow articles, Serial No. 741,061 filed August 23, 1934, issued as Patent No. 2,070,296 of February 9, 1937. A modification of the arrangement of my invention shown in Figure 5 is, however, illustrated in Figure 6 in which a clearance is provided at 22 for the wire I to pass thru so that it can be held and, therefore, this particular design is, in this respect, similar to the device of my aforementioned Patent No. 1,949,431. The end of the wire I is, after being passed thru the clearance, shown as being passed thru a hole 17 in the flange of the plug so that the flange can bear against the fitting 20. The packing 2 is in Figure 6 shown as carried by the member 10a instead of by the fitting 20 as such a modification might be desirable in connection with certain applications of my invention.

In Figure 7 is shown a modification of my pipe joint as shown in the previously described figures which modification is illustrated in combination with the Figures 1 or 2 types of fitting although it can be applied to any use and used in any way to which the preceding forms of my invention can be adapted. In this modification the channel 25 is changed in shape and the aperture 26 intersects the channel thru its wall 28 towards the outer end of the fitting 20. The inner wall 29 of the channel is preferably arranged at a very small angle to the outside of the pipe 10 and within this tapered portion of the channel a packing 2 is arranged so that, as the wire I is wound in the channel thru the aperture 26, it exerts a longitudinal pressure upon the packing with a wedge effect due to the taper, thus causing the packing to tightly engage the fitting and the outside of the pipe. This modification also has the advantage of having the aperture at a point distant from the inner end of the pipe about which leakage must take place and there is, therefore, more resistance to leakage taking place thru the aperture.

It should be understood that the element referred to as wire can be of any material and section and can be stranded or composed of a number of separate wires twisted or interwoven together to form a cord or tape, or it may be a single homogeneous wire of any material, size and section that can be readily bent in passing thru the aperture and winding about the pipe or internal member.

I claim:

1. A fitting having a socket with a circumferential channel in the interior wall thereof and an aperture intersecting said channel, a deformable ring packing element within said channel, and a means for retaining a member within said fitting and for preventing leakage adjacent said means of retention, comprising a wire of relatively hard, strong material adapted to be wound thru said aperture and into said channel and against said packing by relative rotation between said fitting and said member while a part of said wire first inserted within the channel thru the aperture is held from movement in relation to said member.

2. A fitting having a socket with a circumferential channel in the interior wall thereof and an aperture intersecting said channel, a deformable ring packing element within said channel at one side of said aperture and maintained from substantial longitudinal movement in reference to said aperture, and a means for retaining a member within said fitting and for preventing leakage adjacent said means of retention, comprising a wire of relatively hard, strong material adapted to be wound thru said aperture and into said channel and against said packing at the side thereof adjacent said aperture by relative rotation between said fitting and said member while a part of said wire first inserted within the channel thru the aperture is held from movement in relation to said member.

3. A fitting having a socket with a circumferential channel in the interior wall thereof and an aperture intersecting said channel, a deformable ring packing element within said channel and a means for retaining a member within said fitting and for preventing leakage adjacent said means of retention comprising a wire of relatively hard, strong material adapted to be wound thru said aperture and into said channel and against said member, said packing and a wall of said channel by relative rotation between said fitting and said member while a part of said wire first inserted within the channel thru the aperture is held from movement in relation to said member.

4. A means for forming a joint between an open-ended member having a circumferential channel in the interior wall thereof and a member inserted within said open end, comprising a deformable packing element within said channel and a wire adapted to be wound into said channel by relative rotation between said members, while a part of said wire first inserted within said channel is held from movement in relation to said second mentioned member, to press against said second mentioned member and said packing element and also press said packing against said second mentioned member.

5. A means for forming a joint between an open-ended member having a circumferential channel in the interior wall thereof, and a member inserted within said open end, comprising a deformable packing element within said channel and a wire adapted to be wound into said channel adjacent to said packing element by relative rotation between said members while a part of said wire first inserted within the channel is held from movement in relation to said second mentioned member.

6. A means for forming a joint between an open-ended member having a circumferential channel in the interior wall thereof and a member inserted within said open end, comprising a deformable packing element within said channel and engaging a wall of said channel distant from the end of the said open ended member, said wall being at an angle to the outer surface of the second mentioned member, and a wire adapted to be wound into said channel by relative rotation between said members, while a part of said wire first inserted within the channel is held from movement in relation to said second mentioned member, with said wire thus wound into said channel adjacent to said packing element pressing said packing element longitudinally against said angular portion of said wall and causing said packing to wedge between said wall portion and said second mentioned member.

ALDEN E. OSBORN.